United States Patent [19]

Kasenga et al.

[11] Patent Number: 5,185,180
[45] Date of Patent: Feb. 9, 1993

[54] METHOD OF IMPROVING THE MAINTENANCE OF A FLUORESCENT LAMP CONTAINING EUROPIUM-ACTIVATED BARIUM MAGNESIUM SILICATE PHOSPHOR

[75] Inventors: Anthony F. Kasenga, Towanda; Tuan A. Dang, Sayre, both of Pa.

[73] Assignee: GTE Products Corporation, Stamford, Conn.

[21] Appl. No.: 862,121

[22] Filed: Apr. 2, 1992

Related U.S. Application Data

[63] Continuation of Ser. No. 614,465, Nov. 13, 1990, which is a continuation-in-part of Ser. No. 386,757, Jul. 31, 1989, abandoned.

[51] Int. Cl.$^5$ ............................................. C09K 11/59
[52] U.S. Cl. .............................. 427/67; 252/301.4 F; 313/486
[58] Field of Search ................. 252/301.4 F; 313/486; 427/67

[56] References Cited

U.S. PATENT DOCUMENTS

| | | | |
|---|---|---|---|
| 3,157,602 | 11/1964 | Ropp | 252/301.6 F |
| 3,651,363 | 3/1972 | Barry | 252/301.4 F |
| 3,676,361 | 7/1972 | Datta | 252/301.4 F |

Primary Examiner—Jack Cooper
Attorney, Agent, or Firm—Elizabeth A. Levy

[57] ABSTRACT

The initial power output and maintenance of a fluorescent lamp containing europium-activated barium magnesium silicate phosphor is significantly improved by combining the phosphor with a flux and subjecting the phosphor/flux mixture to a refiring and rewashing process before applying the phosphor to the interior of a fluorescent lamp envelope. Surface concentrations of europium and barium are significantly increased, while surface concentrations of magnesium and silicon are decreased.

21 Claims, 2 Drawing Sheets

METHOD OF IMPROVING THE MAINTENANCE OF A FLUORESCENT LAMP CONTAINING EUROPIUM-ACTIVATED BARIUM MAGNESIUM SILICATE PHOSPHOR

This application is a continuation of application Ser. No. 614,465, filed Nov. 13, 1990, which is a continuation-in-part of copending U.S. patent application Ser. No. 07/386,757, entitled "Europium Activated Barium Magnesium Silicate Phosphor and Process for Producing Same", by A. Kasenga and T. Dang, filed Jul. 31, 1989, now abandoned.

TECHNICAL FIELD

The invention relates to fluorescent lamp phosphors used in photocopy applications.

BACKGROUND ART

Europium-activated barium magnesium silicate phosphors are fluorescent lamp phosphors used in photocopy applications. When excited by 254 nm radiation, this phosphor emits light at a peak wavelength of 398 nm and a bandwidth of 24 nm. Such a phosphor has the general formulation $BaMg_2Si_2O_7$:Eu and is described in U.S. Pat. No. 3,651,363 to Barry, the disclosure of which is incorporated by reference.

The atomic concentration of the component elements of the prior art phosphor at its particle surfaces can be measured by Electron Spectroscopy for Chemical Analysis (ESCA) and is typically as follows: 2.3% barium, 1.4% europium, 25% magnesium, 15% silicon and the balance oxygen.

Lamps made with the prior art phosphor generally have poor 100-hour performance (maintenance) characteristics.

SUMMARY OF THE INVENTION

We have found that refiring the prior art phosphor with a flux and then washing the refired phosphor significantly improves not only 100-hour lamp maintenance but also initial lamp power output over lamps made with the prior art phosphor not subjected to such treatment. This process changes the atomic concentration of the component elements of the phosphor at its particle surfaces.

It is an object of the invention to improve the initial power output and maintenance of a fluorescent lamp containing a europium-activated barium magnesium silicate phosphor.

It is another object of the invention to provide a europium-activated barium magnesium silicate phosphor having a higher concentration of europium and barium, and a lower concentration of magnesium and silicon, on the phosphor particle surfaces than is found in prior art europium-activated barium magnesium silicate phosphors not treated by the method of this invention.

In accordance with the present invention there is provided a process for improving the initial power output and maintenance of a fluorescent lamp containing europium-activated barium magnesium silicate phosphor having the general formulation $BaMg_2Si_2O_7$:Eu, comprising the steps of combining a europium-activated barium magnesium silicate phosphor with a flux to form a uniform mixture; firing the mixture in a reducing atmosphere at a temperature of about 1150° C. to about 1300° C. for about 2 to 6 hours; washing the fired mixture in an aqueous solution of potassium hydroxide; removing the potassium hydroxide solution from the fired mixture and washing the resulting potassium hydroxide-washed mixture with deionized water; filtering, drying and screening the resulting washed mixture to obtain a treated europium-activated barium magnesium silicate phosphor; and coating the interior of a fluorescent lamp envelope with the treated phosphor.

The europium-activated barium magnesium silicate phosphor made by the method of the present invention has a surface concentration of europium which is increased from about 1.4% to about 10%, and a surface concentration of barium which is increased from about 2.3% to about 4.6%, over the surface concentrations of europium and barium in europium-activated barium magnesium silicate phosphors not treated by the process of this invention. Similarly, the surface concentration of magnesium is decreased from about 25% to about 17%, and the surface concentration of silicon is decreased from about 15% to about 11%, from the surface concentrations of magnesium and silicon in europium-activated barium magnesium silicate phosphors not treated by the process of this invention.

DETAILED DESCRIPTION OF THE INVENTION

Figure 1:
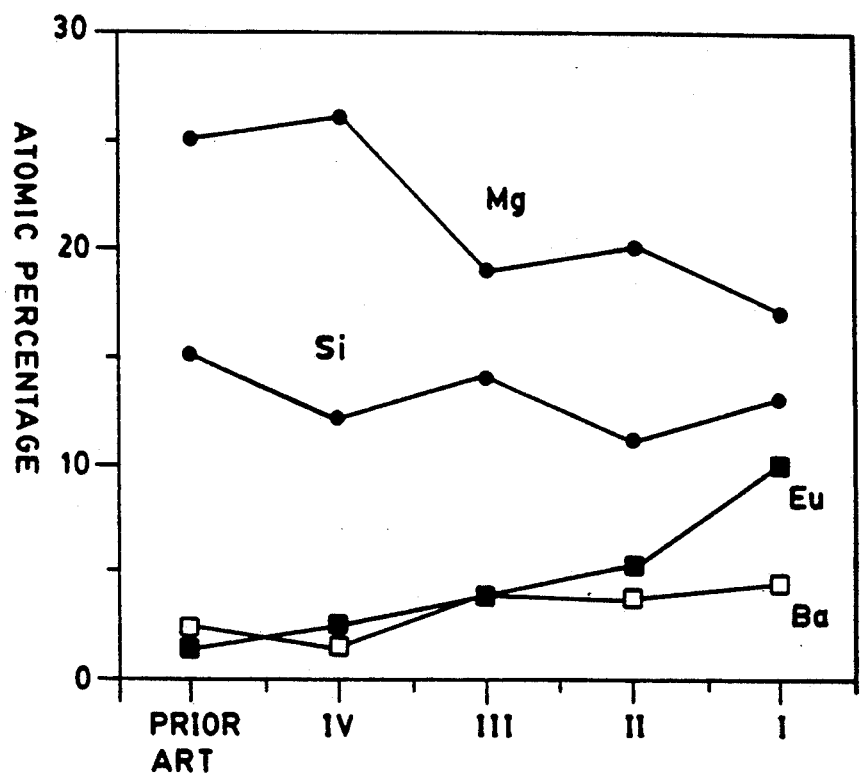
FIG. 1 is a plot of atomic concentrations of europium, barium, magnesium and silicon at particle surfaces of the europium-activated barium magnesium silicate phosphor made by the method of this invention and of the prior art europium-activated barium magnesium silicate phosphor.
Figure 2:
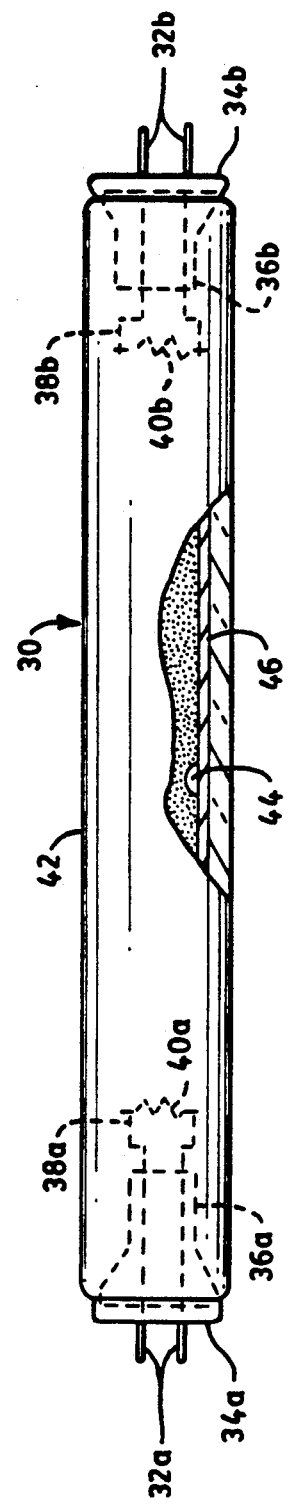
FIG. 2 is a drawing of a fluorescent lamp coated with a europium-activated barium magnesium silicate phosphor made by the method of this invention.

Various test lots of a europium-activated barium magnesium silicate phosphor, such as Type 217 (available from the Chemical and Metallurgical Division of GTE Products Corp., Towanda, Pa.) were refired with a flux and washed; refired without a flux and washed; refired with a flux but not washed; or simply washed. Lamp performance at 0 and 100 hours was measured and compared to a control sample (the prior art europium-activated barium magnesium silicate phosphor) not subjected to either the addition of flux or any of the refiring or washing procedures described herein.

The general formulation of the phosphor is $BaMg_2Si_2O_7$:Eu. The phosphor is prepared by the methods described in U.S. Pat. No. 3,651,363 to Barry, previously incorporated by reference. This phosphor has an atomic concentration of its component elements at its particle surfaces of, typically, 2.3% barium, 1.4% europium, 25% magnesium, 15% silicon and the balance oxygen, as determined by ESC.

A significant improvement in initial power output and in 100-hour maintenance is obtained with a europium-activated barium magnesium silicate phosphor which has been refired with a fluoride flux and washed with a potassium hydroxide wash. Maintenance is defined as the ratio of the 100-hour output to the 0-hour output in a fluorescent lamp.

The flux used is preferably ammonium fluoride. Some other fluxes which can be used include barium fluoride, barium silicofluoride, magnesium silicofluoride, ammonium silicofluoride, magnesium fluoride, calcium fluoride, strontium fluoride, and combinations thereof. The flux is blended with the phosphor so that the flux makes up about 0.06% to about 0.25% by weight of the phosphor/flux mixture.

The refiring step is carried out at a temperature of about 1150° C. to about 1300° C. for about 2 to 6 hours in a reducing atmosphere, preferably one in which the hydrogen:nitrogen ratio is about 33%:67%.

The washing step is carried out in an aqueous solution of potassium hydroxide which is preferably heated to about 60° C. The ratio of potassium hydroxide to phosphor is preferably 1:1, although the proportions can range from 0.7:1 to 1.3:1. The aqueous potassium hydroxide solution is prepared using about 13 parts potassium hydroxide to 100 parts deionized water.

A fluorescent lamp 30 comprises a transparent, light-transmitting sealed envelope 42, preferably glass. The envelope 42 is fitted at each end with mounts comprising electrodes 40a and 40b, re-entrant stem presses 36a and 36b and lead-in conductors 38a and 38b. Base caps 34a and 34b and pins 32a and 32b are provided at each end of the envelope 42, together with a small charge of mercury 44 within the envelope 42.

The inner surface of the envelope 42 is coated with a phosphor layer 46 which includes the europium-activated barium magnesium silicate phosphor made by the method of this invention as described herein.

EXAMPLE I

Europium-activated barium magnesium silicate phosphor (1049.7 grams) having the general formulation $BaMg_2Si_2O_7$:Eu and an atomic concentration at its particle surfaces of 2.3% barium, 1.4% europium, 25% magnesium, 15% silicon and the balance oxygen, is blended with ammonium fluoride (1.333 grams) to form a phosphor/flux mixture containing about 0.127% by weight ammonium fluoride flux. The mixture is fired in uncovered silica trays at 1230° C. for 3 hours and 20 minutes in a reducing atmosphere of 33% hydrogen/67% nitrogen by volume. The resulting fired cake is broken up and washed for 2 hours in a solution of 500 grams of potassium hydroxide and 500 grams of fired phosphor in 3.8 liters of deionized water which has been heated to about 60° C. Following this washing step, the potassium hydroxide solution is decanted off and the fired phosphor is repeatedly washed with deionized water until the pH of the phosphor is less than about 10. The washed phosphor is then filtered, oven dried, screened and applied to the envelope of a fluorescent lamp in any known manner such as, for example, the method described in U.S. Pat. No. 4,307,321 to Pappalardo et al.

EXAMPLE II

The procedure of Example I is followed, except that no fluoride flux is used. Only the firing and washing steps are performed.

EXAMPLE III

The procedure of Example I is followed, except no potassium hydroxide wash is used. Ammonium fluoride flux is blended with the phosphor and the mixture is fired as in Example I.

EXAMPLE IV

The procedure of Example I is followed, except no fluoride flux is used and no refiring step is carried out. Only the potassium hydroxide wash is performed on the phosphor.

The lamp performance data for the prior art phosphor and for the phosphors prepared in Examples I–IV are indicated in Table I. The atomic concentrations of these phosphors are plotted in FIG. 1.

TABLE I

| | LAMP PERFORMANCE DATA | | |
| --- | --- | --- | --- |
| SAMPLE | 0 HOUR OUTPUT mW | 100 HOUR OUTPUT mW | MAINTENANCE AT 100 HOURS % |
| CONTROL | 5733 | 3035 | 53.0% |
| EXAMPLE I (FLUX, REFIRE, AND KOH WASH) | 7446 | 6470 | 86.9% |
| EXAMPLE II (REFIRE AND KOH WASH) | 7165 | 5847 | 81.6% |
| EXAMPLE III (FLUX AND REFIRE) | 5756 | 5428 | 80.3% |
| EXAMPLE IV (KOH WASH ONLY) | 5972 | 3727 | 62.4% |

It is apparent from Table I that by subjecting a europium-activated barium magnesium silicate phosphor to a process wherein the phosphor is refired with a flux and then washed with a potassium hydroxide wash, lamps made with this phosphor have improved initial power output and improved 100-hour maintenance. Example I data indicate that the addition of ammonium fluoride flux to the phosphor, combined with the refiring and washing steps described in the method of this invention, significantly improves the 0-hour output and the 100-hour maintenance of fluorescent lamps containing this phosphor. Improvements in 0-hour output and in 100-hour maintenance are also seen, to a lesser extent, in lamps containing a europium-activated barium magnesium silicate phosphor which has been refired without a flux and washed (Example II). Lamps made with a europium-activated barium magnesium silicate phosphor which has been blended with fluoride flux and refired but not washed (Example III) exhibit an increase in 100-hour maintenance. Lamps made with a europium-activated barium magnesium silicate phosphor not refired with a flux but subjected only to a potassium hydroxide wash (Example IV) showed a slight increase in 0-hour output and 100-hour maintenance.

It is believed that this process of firing the prior art phosphor with a flux and then washing the fired phosphor in potassium hydroxide causes a redistribution of the elemental components of the phosphor on the surface of the phosphor. ESCA analysis indicates that the atomic concentrations of europium and barium at the surface of the phosphor particles are significantly increased, as shown in the plot of FIG. 1. Surface concentrations of magnesium and silicon are slightly lower in the phosphor treated by the method of the present invention, than in prior art phosphors not so treated.

In europium-activated barium magnesium silicate phosphors made by the methods of Examples I–IV, the surface concentration of europium is from about 1.4% to about 10%, the surface concentration of barium is from about 1.5% to about 4.6%, the surface concentration of magnesium is from about 17% to about 26%, and the surface concentration of silicon is from about 11% to about 15%, with the balance oxygen.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for improving the initial power output and maintenance of a fluorescent lamp containing europium-activated barium magnesium silicate phosphor having the general formulation $BaMg_2Si_2O_7$:Eu and an atomic concentration of component elements at its particle surfaces of 2.3% barium, 1.4% europium, 25% magnesium, 15% silicon and the balance oxygen, comprising the steps of:
   a) combining said europium-activated barium magnesium silicate phosphor with a flux selected from the group consisting of barium fluoride, barium silicofluoride, magnesium silicofluoride, ammonium silicofluoride, ammonium fluoride, magnesium fluoride, calcium fluoride, and strontium fluoride, said flux being in an amount of between about 0.06% and 0.25% by weight of the phosphor/flux mixture to form a uniform mixture;
   b) firing said mixture in a reducing atmosphere at a temperature of about 1150° C. to about 1300° C. for about 2 to 6 hours;
   c) washing said fired mixture in an aqueous solution of potassium hydroxide;
   d) removing said potassium hydroxide solution from said fired mixture and washing the resulting potassium hydroxide-washed mixture with deionized water;
   e) filtering, drying and screening the resulting washed mixture to obtain a treated europium-activated barium magnesium silicate phosphor; and
   f) coating the interior of a fluorescent lamp envelope with said treated phosphor.

2. The process of claim 1 wherein said flux is ammonium fluoride.

3. The process of claim 1 wherein said reducing atmosphere comprises about 33% by volume hydrogen and about 67% by volume nitrogen.

4. The process of claim 1 wherein said aqueous solution of potassium hydroxide is maintained at a temperature of about 60° C.

5. The process of claim 1 wherein said phosphor is washed in said aqueous solution of potassium hydroxide for about 2 hours.

6. The process of claim 1 wherein the weight ratio of said potassium hydroxide to said phosphor is about 0.7:1 to about 1.3: 1.

7. The process of claim 1 wherein the weight ratio of said potassium hydroxide to said phosphor is about 1:1.

8. The process of claim 1 wherein said mixture is washed with deionized water until the pH of said mixture is less than about 10.

9. A process for improving the initial power output and maintenance of a fluorescent lamp containing europium-activated barium magnesium silicate phosphor having the general formulation $BaMg_2Si_2O_7$:Eu and an atomic concentration of component elements at its particle surfaces of 2.3% barium, 1.4% europium, 25% magnesium, 15% silicon and the balance oxygen, comprising the steps of:
   a) firing said europium-activated barium magnesium silicate phosphor in a reducing atmosphere at a temperature of about 1150° C. to about 1300° C. for about 2 to 6 hours to produce a fired phosphor;
   b) washing said fired phosphor in an aqueous solution of potassium hydroxide;
   c) removing said potassium hydroxide solution from said fired phosphor and washing the resulting potassium hydroxide-washed phosphor with deionized water;
   d) filtering, drying and screening the resulting washed phosphor to obtain a treated europium-activated barium magnesium silicate phosphor; and
   e) coating the interior of a fluorescent lamp envelope with said treated phosphor.

10. The process of claim 9 wherein said reducing atmosphere comprises about 33% by volume hydrogen and about 67% by volume nitrogen.

11. The process of claim 9 wherein said aqueous solution of potassium hydroxide is maintained at a temperature of about 60° C.

12. The process of claim 9 wherein said phosphor is washed in said aqueous solution of potassium hydroxide for about 2 hours.

13. The process of claim 9 wherein the weight ratio of said potassium hydroxide to said phosphor is about 0.7:1 to about 1.3:1.

14. The process of claim 9 wherein the weight ratio of said potassium hydroxide to said phosphor is about 1:1.

15. The process of claim 9 wherein said phosphor is washed with deionized water until the pH of said phosphor is less than about 10.

16. A process for improving the initial power output and maintenance of a fluorescent lamp containing europium-activated barium magnesium silicate phosphor having the general formulation $BaMg_2Si_2O_7$:Eu and an atomic concentration of component elements at its particle surfaces of 2.3% barium, 1.4% europium, 25% magnesium, 15% silicon and the balance oxygen, comprising the steps of:
   a) washing said europium-activated barium magnesium silicate phosphor in an aqueous solution of potassium hydroxide;
   b) removing said potassium hydroxide solution from said phosphor and washing said phosphor with deionized water;
   c) filtering, drying and screening the resulting washed phosphor to obtain a treated europium-activated barium magnesium silicate phosphor; and
   d) coating the interior of a fluorescent lamp envelope with said treated phosphor.

17. The process of claim 16 wherein said aqueous solution of potassium hydroxide is maintained at a temperature of about 60° C.

18. The process of claim 16 wherein said phosphor is washed in said aqueous solution of potassium hydroxide for about 2 hours.

19. The process of claim 16 wherein the weight ratio of said potassium hydroxide to said phosphor is about 0.7:1 to about 1.3:1.

20. The process of claim 16 wherein the weight ratio of said potassium hydroxide to said phosphor is about 1:1.

21. The process of claim 16 wherein said phosphor is washed with deionized water until the pH of said phosphor is less than about 10.

* * * * *